Patented Apr. 13, 1948

2,439,534

UNITED STATES PATENT OFFICE 2,439,534

EXTRACTION OF HYDROCARBONS

Benjamin G. Wilkes, Jr., Wilkinsburg, Pa., assignor to Carbide and Carbon Chemicals Corporation, a corporation of New York No Drawing. Application April 7, 1945, Serial No. 587,221

6 Claims. (Cl. 196—14.35)

This invention relates to the separation of mixtures of hydrocarbons into fractions having different chemical compositions. More especially it concerns the selective extraction of hydrocarbon mixtures containing paraffins, cycloparaffins, olefins, diolefines and aromatic hydrocarbons, or two or more of these types thereof, employing a highly efficient stable solvent which is liquid at the extraction temperature and which is highly selective for the more unsaturated hydrocarbons.

One of the more important objects of the invention is to provide a novel and efficient method for separating a mixture of paraffinic and non-paraffinic hydrocarbons into portions one of which is richer in the more paraffinic components of the original mixture and the other of which is richer in the less paraffinic components. Another object is to provide for separating from hydrocarbon oils components having greater chemical unsaturation from components having less chemical unsaturation or from paraffinic components in manner to produce refined oils of relatively paraffinic character. These and other objects will be evident as the description proceeds.

This invention is based upon the discovery that hydrocarbon compositions containing non-paraffinic hydrocarbons, such as those of the naphthenic, olefinic, and aromatic series, with or without paraffinic hydrocarbons, may be effectively separated into fractions respectively richer and poorer in the chemically less saturated components by fractional extraction with certain selective solvents that are relatively high boiling. Hydrocarbons selectively dissolved by these solvents are readily separated from the resultant extract either by simple distillation or by steam distillation of the hydrocarbons from the extract. The solvents possess high selectivity for the more saturated hydrocarbons.

In accordance with this invention, a hydrocarbon mixture containing paraffinic and non-paraffinic hydrocarbons, or one containing hydrocarbon components having varying degrees of chemical unsaturation, has admixed therewith a suitable quantity of an organic liquid containing at least one cyanoalkyl group directly connected with a sulfur atom, an oxygen atom or an amino nitrogen atom.

A preferred group of the selective solvents of the invention may be designated by the formula

wherein A represents a methyl, ethyl,

or —CH₂CHROR' group; X designates S, O, or NR''; R and R'' respectively represent either hydrogen, or a methyl or ethyl group; and R' represents either hydrogen or a methyl, ethyl, —CH₂CH₂CN or —CH₂CHROCH₂CH₂CN group.

The monocyanoethyl derivatives of the aforesaid formula but wherein A designates an alkyl group or a CH₂CHROR' group wherein R' represents an alkyl radical are much less effective in the process than the other extractants herein disclosed when used in the anhydrous state due to a relatively high miscibility with mixtures of aliphatic and aromatic hydrocarbons. Admixture with water decreases the solvent power of these compounds for saturated hydrocarbons while retaining an adequate solvent power for aromatic and other unsaturated hydrocarbons. However, the highly selective solvents which do not require resort to the use of aqueous dilution of the solvents are preferred.

High boiling compounds having outstandingly high selective extraction capacities for the more unsaturated components of hydrocarbon mixtures may be produced by reacting, in the presence of an alkaline condensation catalyst, olefine cyanides such as acrylonitrile with compounds having a suitably reactive hydrogen atom, such as hydrogen sulfide, ammonia, water, the lower monohydric alcohols, the mono- and polyalkylene glycols such as ethylene glycol, propylene glycol, and the di- and triethylene glycols; the monoalkyl ethers of such glycols, such as the methyl and ethyl ethers of ethylene and diethylene glycols; and the primary and secondary amines, including the mono- and polyalkylene amines such as ethylene diamine and diethylene triamine.

Among the compounds thus produced which have been found to possess remarkable selectivity in the removal of the more highly aromatic constituents of hydrocarbon mixtures may be mentioned ethylene glycol di(β-cyanoethyl) ether, NC—C₂H₄—O—C₂H₄—O—C₂H₄—CN; di(β-cyanoethyl) sulfide, NC—C₂H₄—S—C₂H₄—CN; and the corresponding amine and ether,

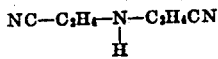

and NC—C₂H₄—O—C₂H₄CN.

Examples of compounds useful as extractants include: ethyl β-cyanoethyl sulfide, β-hydroxyethyl β'-cyanoethyl sulfide, β-methoxyethyl β'-cyanoethyl sulfide, β-methyl-β-hydroxy ethyl β'-cyanoethyl sulfide, methyl β-cyanoethyl ether, β-hydroxyethyl β'-cyanoethyl ether, β-methoxyethyl β'-cyanoethyl ether, ethyl β-cyanoethyl amine, β-hydroxyethyl β'-cyanoethyl amine, β-methyl-β-hydroxy ethyl β'-cyanoethyl amine, β-methyl-β-methoxyethyl β'-cyanoethyl amine, diethylene glycol di(β-cyanoethyl)ether, and β, β' di-(cyanoethylamino)ethane.

The solvents employed in connection with this invention not only have a high degree of selectivity for the aromatic and the more unsaturated components of hydrocarbon mixtures but they possess as a class this high selectivity over a fairly wide temperature range including temperatures around atmospheric. The treated hydrocarbon mixture readily separates into extract and raffinate phases. Furthermore, the solvent is stable under the conditions of its use and does not react with components of the mixtures being extracted. The solvent and the hydrocarbons of the extract phase are separated readily either by simple distillation, steaming, or by other means, such as washing or leaching with water. The relatively high solvent power of these selective solvents for aromatic and the more unsaturated components makes unnecessary the use of large proportions of the solvents. Because of the high selectivity of these extractants at atmospheric temperatures, they may be employed effectively without recourse to refrigeration, or high temperature treatment and the like, which are sometimes used to improve the selective solvent action of extractants for certain hydrocarbons.

According to one form of the invention the hydrocarbon mixture is flowed in intimate countercurrent contact with a stream of the high boiling selective solvent. Some of the solvents employed in this invention are water-soluble or water-miscible while others are relatively water-insoluble. Thus, hydrocarbons selectively dissolved by these solvents are in general preferably separated from the resultant extract by steam distillation of the hydrocarbons from the extract.

By applying the process to a hydrocarbon mixture of narrow boiling range, for example, one boiling within a range of 15° C., it is possible to recover substantially pure hydrocarbons such as toluene, benzene, hexane, cyclohexane, styrene, ethyl benzene, the xylenes and butadiene in a commercially practicable manner. Hydrocarbon mixtures derived from the distillation or cracking of petroleum, or coal tar hydrocarbons, and particularly mixtures containing hydrocarbons which have between 4 and 10 carbon atoms in the molecule, may be effectively treated by the process.

According to one preferred form of the invention a liquid hydrocarbon mixture to be separated into components of different degrees of chemical unsaturation, or of different structural configurations, is flowed into intimate countercurrent contact with a stream of a high boiling solvent having at least one —CH₂CH₂CN group directly connected with an atom of S, or O, or an amino nitrogen. The extraction may be performed under atmospheric pressure, or at pressures above or below atmospheric, in an extraction column or in a series of interconnected columns or batch extractors. Temperatures around 30° C. conveniently may be used. At this temperature the solvents such as di(β-cyanoethyl) sulfide and the corresponding amine and ether are miscible in all proportions with benzene, and are almost entirely immiscible with paraffin hydrocarbons. A single stage extraction at 25° C. of a mixture containing 50% of benzene and 50% of cyclohexane by volume, with an equal volume of di(β-cyanoethyl) amine yielded an aromatic or extract hydrocarbon fraction containing 85.4% of benzene and a raffinate hydrocarbon fraction containing 38.2% of benzene. A continuous countercurrent or multiple stage extraction of a mixture of equal parts of benzene and cyclohexane also will yield at equilibrium extracted hydrocarbons containing approximately 85% of benzene. This value can be increased to a maximum of 90% of benzene by reflux enrichment, which is accomplished by recovering from the extract layer the contained hydrocarbon rich in toluene, and returning some of this to the extraction column with the mixture to be extracted. The raffinate of this system without enrichment contains approximately 73% of cyclohexane. By increasing the solvent-hydrocarbon ratio to 2:1, a raffinate completely denuded of benzene and containing less than 1% of di(β-cyanoethyl)-amine may be secured.

Table A indicates the comparative effectiveness of two extractants, including one of the solvents of the present invention. The extraction index of comparison is based upon a single-stage extraction at 25° C. of a mixture of aromatic and aliphatic hydrocarbons having the compositions described in Table A.

$$\text{The index} = \frac{y}{x} \frac{1-x}{1-y} \frac{x}{f} \frac{f-x}{y-x}$$

where $f$, $x$ and $y$, respectively, are the aromatic concentrations of the hydrocarbon content of the feed, raffinate and extract layers.

Table A

| Sample | 1 | 2 | 3 | 4 |
|---|---|---|---|---|
| Hydrocarbon composition, per cent by volume | 30% benzene / 70% heptane | 30% benzene / 70% heptane | 50% toluene / 50% "Troluoil" | 50% toluene / 50% "Troluoil" |
| Solvent | A | B | A | B |
| Solvent-hydrocarbon ratio | 1:1 | 1:1 | 1:1 | 1:1 |
| Composition of hydrocarbons from solvent layer, per cent aromatic | 87 | 68 | 94 | 81 |
| Composition of hydrocarbons from raffinate layer, per cent aromatic | 22 | 19 | 43 | 44 |
| Per cent of total aromatic hydrocarbons recovered in solvent layer | 40 | 51 | 31 | |
| Selectivity index | 8.5 | 4.6 | 5.7 | 1.6 |

Solvent A was di (β-cyanoethyl) sulfide; and solvent B (for comparison) was diaminoethyl sulfide which is known to be an excellent selective solvent for extractions of this type. "Troluoil" is a trade name used to designate an aliphatic hydrocarbon mixture boiling over the range of 93°–115° C., and containing a small percentage of aromatic hydrocarbons.

The following examples are presented merely to illustrate certain forms of the invention.

Example 1

A raw neutral Mid-Continental oil stock having a viscosity index of 60, measured by A. S. T. method D567, was extracted at 70° C. in a single stage by mixing it with an equal volume of di($\beta$-cyanoethyl) amine. The raffinate which separated upon standing contained less than 0.2% by weight of dicyanoethylamine which was readily removed by washing with water, yielding an oil with a viscosity index of 71.

The extract was diluted with water and then separated into an aqueous solvent layer and a firm sticky dark amber resin evidently devoid of paraffinic oils. The solvent was recoverable from the aqueous solvent layer by distillation to remove the water.

Example 2

Into each of nine vessels was introduced an intimate mixture composed of three volumes of di($\beta$-cyanoethyl) sulfide and one volume of an equivolume mixture of toluene and "Troluoil." Each of the mixtures then was permitted to stratify, forming a lower extract layer and an upper raffinate layer. The raffinate layers were successively conducted in stages toward the ninth vessel where three volumes of fresh solvent were introduced during each batch transfer. The extract layers were progressively conducted toward the first stage vessel where one volume of the hydrocarbon mixture was introduced with each batch transfer. After equilibrium had been reached, as established by the constancy of the composition of the final raffinate and extract layers, an extract phase was secured, the hydrocarbon portion of which contained 94.1% of toluene. Complete recovery of the toluene was achieved in the extract phase, the raffinate layer being substantially free from aromatic hydrocarbons. The raffinate contained only about 1% by volume of dicyanoethyl sulfide. The hydrocarbons were recovered from the extract by steam distillation at 125° C.

A substantially complete separation of the hydrocarbon mixture into a pure toluene extract phase and an aromatic-free raffinate may be secured by a continuous counter-current extraction procedure wherein the outgoing extract phase is contacted with a toluene-enriched feed in a conventional "reflux enrichment" operation. Di($\beta$-cyanoethyl)amine has a greater solubility for aromatic hydrocarbons such as toluene than has di($\beta$-cyanoethyl) sulfide. These solvents have very low and substantially equal solubilities for paraffinic hydrocarbons, as indicated in the following example.

Example 3

A four-stage batch extraction of a mixture of equal volumes of toluene and "Troluoil" with di($\beta$-cyanoethyl)amine was conducted at 25° C., using a 3:1 solvent-hydrocarbon feed ratio by volume. Fresh solvent was added at the fourth stage, and the raffinate was recovered from that stage. The hydrocarbon mixture was introduced at the first stage, and the extract layer was removed from that stage.

At equilibrium, shown by the constant composition of the successive raffinate and solvent layers, a raffinate fraction of pure "Troluoil" was secured, while the hydrocarbon fraction recovered from the final extract fraction contained 90.2% of toluene. The raffinate from an identical, four-stage extraction using di-cyanoethyl sulfide still contained 3.75% by volume of toluene.

The cyanoalkyl amine solvents of the invention are more efficient extractants than are the corresponding cyanoalkyl sulfides for the production of aromatic-free raffinates, and achieve these results at lower solvent-to-feed ratios. The former possess the further advantages over the cyanoalkyl sulfides of relatively mild odor, and lower melting point.

Example 4

The data presented in Table B are the results of single-stage extractions of certain representative mixtures containing saturated hydrocarbons and/or hydrocarbons of different degrees of chemical unsaturation. The extractions were conducted at 25° C., using equal volumes of the hydrocarbons and of the solvent. In the analysis of the extract fractions, the hydrocarbons were removed by steam distillation and recovered.

Table B

| Solvent | Original Hydrocarbon Composition (per cent by volume) | Extracted Hydrocarbon | | Raffinate | |
|---|---|---|---|---|---|
| | | Per cent by volume | Composition (per cent by volume) | Per cent by volume | Composition (per cent by volume) |
| C | 50% toluene / 50% "Troluoil" | 20 | 95% toluene / 5% "Troluoil" | 80 | 40% toluene / 60% "Troluoil." |
| C | 40% styrene / 60% xylene | 48 | 65% styrene / 35% xylene | 52 | 25% styrene / 75% xylene. |
| D | 50% benzene / 50% cyclohexane | 25 | 85.4% benzene / 14.6% cyclohexane | 74 | 38.2% benzene / 61.8% cyclohexane. |
| D | 20% styrene / 80% ethyl benzene | 52 | 22.2% styrene / 77.8% ethyl benzene | 48 | 17.3% styrene / 82.7% ethyl benzene. |
| E | 20% styrene / 80% ethyl benzene | 36 | 25.4% styrene / 74.6% ethyl benzene | 64 | 17% styrene / 83% ethyl benzene. |

In Table B, solvent C is di($\beta$-cyanoethyl)ether; solvent D is di($\beta$-cyanoethyl)amine; and solvent E is di($\beta$-cyanoethyl)sulfide.

The single stage extraction of benzene from cyclohexane demonstrates the outstanding selectivity of dicyanoethylamine as a solvent for aromatic hydrocarbons. A continuous countercurrent extraction or a multiple stage batch extraction of a mixture of equal parts of benzene and cyclohexane yields at equilibrium an extracted hydrocarbon mixture containing about 85% of benzene. By increasing the solvent to hydrocarbon feed ratio to 2:1, a raffinate may be obtained that is completely denuded of benzene and contains less than 1% of dicyanoethylamine. A somewhat lower degree of selectivity is apparent in the extraction of styrene from xylene with dicyanoethyl ether. However, even in the difficultly extractable styrene-ethylbenzene system, a very substantial selectivity is evidenced.

Example 5

The following data are based upon batch extractions of equivolume mixtures of toluene and "Troluoil" with a like volume of the extractant indicated. The hydrocarbons and the extractant were intimately mixed at 25° C., and were then permitted to stratify. The lower extract layer was separated from the raffinate layer, and the aromatic-rich extracted hydrocarbon content recovered from the former by steam distillation. In each instance the concentration of solvent in the raffinate layer was less than 1% by volume.

Table C
[The hydrocarbon composition extracted was 50% by volume toluene the balance being "Troluoil"]

| Solvent | F | G | H | I | K |
| --- | --- | --- | --- | --- | --- |
| Solvent-hydrocarbon ratio | 1:1 | 1:1 | 1:1 | 1:1 | 1:1 |
| Composition of hydrocarbons in extract layer, per cent aromatics | 95 | 92.5 | 85 | 93.5 | 94.5 |
| Composition of hydrocarbons in raffinate layer, per cent aromatics | 42.5 | 37 | 40.2 | 46.5 | 47.0 |
| Per cent of total aromatic hydrocarbons in the extract layer | 28 | 42.5 | 37.4 | 12 | 11.2 |

Solvent F was $\beta$-cyanoethyl-$\beta'$-hydroxyethyl ether; solvent G was ethylene glycol di($\beta$-cyanoethyl)ether; solvent H was diethylene glycol di($\beta$-cyanoethyl)ether; solvent I was $\beta$-cyanoethyl-$\beta'$-hydroxyethyl sulfide; and solvent K was $\beta$-cyanoethyl-$\beta'$-hydroxyethylamine.

The data presented in Table C illustrate the highly selective nature of the cyanoethyl ethers of the glycols in the extraction of aromatic hydrocarbons from non-aromatic hydrocarbons. It will be noted that solvent G is also remarkably efficient as an extractant, removing 42.5% of the total toluene of the system in a single batch process at a solvent-hydrocarbon ratio of only 1:1.

Solvents F and G may be made by reacting acrylonitrile and ethylene glycol containing a small amount of aqueous potassium hydroxide. The reaction mixture is neutralized with hydrochloric acid, the solid salts separated, and the liquid fractionally distilled under vacuum. Solvent F boils at 115°–117° C. under 2 mm. of mercury, absolute pressure; and Solvent G boils at 165° C. under 35 mm. of mercury, absolute pressure.

Solvent H can be made in similar manner by substituting diethylene glycol for the ethylene glycol. Solvent H boils at 205°–210° C. under an absolute pressure of 3 mm. of mercury.

Solvent I may be made by reacting at 50° C. acrylonitrile and mercaptoethanol containing N-methyl morpholine as catalyst, and distilling the reaction mixture at a pressure of 5 mm. of mercury. Solvent I boils at 160°–165° C. at that pressure.

Solvent K may be made by reacting acrylonitrile and monoethanolamine at 20°–25° C., and fractionating the residual mixture under a high vacuum.

The process of the invention is applicable for the separation of components of normally gaseous and vaporous mixtures of saturated hydrocarbons and/or hydrocarbons of various degrees of chemical unsaturation, such as mixtures of butylenes and butadiene. Normally gaseous hydrocarbon mixtures containing olefines and paraffin hydrocarbons may have the olefines absorbed by extracting such a mixture with the selective solvents of the invention.

It will be seen that this invention effects the separation, from mixtures of hydrocarbons, and preferably from those mixtures having boiling ranges not greater than about 50° C. of hydrocarbons having different degrees of chemical unsaturation or of different structural configurations. The separation may be effected at room temperature, or at temperatures either below or above room temperature. Preferably the hydrocarbons are recovered from the extract phase thus separated by the usual steam distillation or the equivalent.

I claim:

1. Process for separating a hydrocarbon mixture into portions respectively enriched in the chemically more unsaturated constituents and in the chemically less unsaturated or saturated constituents of such mixture, which comprises extracting the hydrocarbon mixture with a N-di($\beta$-cyanoethyl) amine.

2. Process for separating a hydrocarbon mixture into portions respectively enriched in the chemically more unsaturated constituents and in the chemically less unsaturated or saturated constituents of such mixture, which comprises extracting the hydrocarbon mixture with an aliphatic dicyano amine formed by reacting acrylonitrile with an alkylene amine.

3. Process for separating a hydrocarbon mixture into portions respectively enriched in the chemically more unsaturated constituents and in the chemically less unsaturated or saturated constituents of such mixture, which comprises extracting the hydrocarbon mixture with a dicyano imino compound formed by reacting acrylonitrile with a polyalkylene amine.

4. Process for separating a hydrocarbon mixture into portions respectively enriched in the chemically more unsaturated constituents and in the chemically less unsaturated or saturated constituents of such mixture, which comprises extracting the hydrocarbon mixture with a di(cyanoethyl) amine.

5. Process for separating a hydrocarbon mixture into portions respectively enriched in the chemically more unsaturated constituents and in the chemically less unsaturated or saturated constituents of such mixture, which comprises extracting the hydrocarbon mixture with an aliphatic cyano compound formed by reacting acrylonitrile with a compound selected from the class consisting of the mono- and polyethylene amines, and the monomethyl and monoethyl ethers of ethylene glycol, of diethylene glycol and of triethylene glycol.

6. Process for separating a hydrocarbon mixture into portions respectively enriched in the chemically more unsaturated constituents and in the chemically less unsaturated or saturated constituents of such mixture, which comprises extracting the hydrocarbon mixture with $\beta,\beta'$-di(cyanoethylamino) ethane.

BENJAMIN G. WILKES, JR.

REFERENCES CITED

The following references are of record in the file of this patent:

UNITED STATES PATENTS

| Number | Name | Date |
| --- | --- | --- |
| 1,813,946 | Nicodemus | July 14, 1931 |
| 1,919,752 | Schmidt et al. | July 25, 1933 |
| 2,023,375 | Van Dijck I | Dec. 3, 1935 |
| 2,092,739 | Van Dijck II | Sept. 7, 1937 |
| 2,139,000 | Cohen | Dec. 6, 1938 |
| 2,160,607 | Van Dijck III | May 30, 1939 |
| 2,162,963 | McKittrick | June 20, 1939 |
| 2,205,996 | Van Wijk | June 25, 1940 |
| 2,285,696 | Dunn I | June 9, 1942 |
| 2,288,126 | Dunn et al. III | June 30, 1942 |
| 2,290,636 | Deanesly | July 21, 1942 |